United States Patent [19]

Searle

[11] Patent Number: 5,152,182
[45] Date of Patent: Oct. 6, 1992

[54] TORQUE MEASURING APPARATUS
[75] Inventor: Robert F. Searle, Amherst, N.H.
[73] Assignee: Vibrac Corporation, Amherst, N.H.
[21] Appl. No.: 686,609
[22] Filed: Apr. 17, 1991
[51] Int. Cl.⁵ .............................................. G01L 5/24
[52] U.S. Cl. ............................. 73/862.23; 73/862.21
[58] Field of Search ........... 73/862.08, 862.21, 862.22, 73/862.23, 847; 209/546; 53/331.5, 490

[56]  References Cited
U.S. PATENT DOCUMENTS
4,212,196  7/1980  Krieger et al. ............. 73/862.21 X Primary Examiner—Michael Razavi
Assistant Examiner—Elizabeth L. Shopbell
Attorney, Agent, or Firm—Pandiscio & Pandiscio

[57]  ABSTRACT

A torque measuring apparatus is described that comprises: (1) a pair of parallel flexible mechanical beams mounted in like cantilever fashion on a chassis; (2) a torque-transmitting shaft rotatably mounted to the chassis; (3) a force-transmitting arm having a first end attached to the torque-transmitting shaft so as to rotate therewith and a second end extending between and adjacent to said beams; (4) an encoder having a rotatable input shaft coupled to said torque-transmitting shaft so that rotation of said torque-transmitting shaft will cause rotation of said input shaft; and (5) means on said torque-transmitting shaft for coupling said torque-transmitting shaft to one component of an aritcle to be tested, e.g., the screw cap on a tube or bottle, whereby a torque applied to said one component is transmitted to said torque-transmitting shaft. The applied torque causes the torque-transmitting shaft to act via the force-transmitting arm to bend one or the other of the two beams, according to the direction of rotation of said shaft. The encoder translates the rotation of the torque-transmitting shaft into an electrical output that varies as a function of the applied torque. Additional means are provided for producing an output signal that is indicative of the magnitude of the applied torque.

8 Claims, 6 Drawing Sheets

TORQUE MEASURING APPARATUS

This invention relates to torque measurement and more particularly to a novel and improved system and method for conducting torque measurements on a variety of devices and articles, including but not limited to such diverse items as screw-closures for bottles, tubes and other containers, bearings having rotatable components, electric and air motors, film cartridges, etc.

BACKGROUND OF THE INVENTION

In many industries it is necessary or desirable to measure the torque required to rotate one of two relatively rotatable components relative to the other of said components for various purposes, e.g., for quality control. Thus, for example, in industries involving the manufacture and/or filling of containers having screw-type closures, e.g., flexible or inflatable tubes or bottles used to contain commodities such as toothpastes, shampoos, lotions, adhesives, oils, etc., it is essential that in the course of manufacture the caps be screwed on tight enough so as not to leak, but also not so hard as to make them difficult to unscrew using only hand action. Hence, a simple and reliable means for measuring the torque required to unscrew such caps is desirable. Similarly, precision shaft bearings for (1) aircraft subassemblies, (2) electric and air motors, (3) hydraulic and pneumatic pumps, and (4) magnetic tape and disk drives, for example, are commonly required to have a torque resistance to rotational movement that falls within predetermined limits, and in many cases it is essential that the torque measuring system be able to rapidly and reliably provide a pass/fail indication in lieu of or in addition to an indication or measurement of torque value.

Heretofore, many different types of torque measuring devices and systems have been produced for various applications. There have been relatively simple cap testers, such as the ones disclosed by the following patents: (1) U.S. Pat. No. 4,539,852, issued Sep. 10, 1985 to Jerome H. Feld, (2) U.S. Pat. No. 4,716,772, issued Jan. 5, 1988 to K. B. Bubech et al, and (3) U.S. Pat. No. 4,794,801, issued Jan. 3, 1989 to T. M. Andrews et al. There have been relatively complex cap testers such as shown by (1) U.S. Pat. No. 38366463, issued Feb. 18, 1975 to D. A. Smith et al, (2) U.S. Pat. No. 4,696,144, issued Jul. 29, 1987 to G. E. Bankuty et al, (3) U.S. Pat. No. 4,811,850, issued Mar. 14, 1989 to G. E. Bankuty et al, and (4) U.S. Pat. No. 4,907,700, issued Mar. 13, 1990 to G. E. Bankuty et al.

Still other forms of torque-measuring systems are known to persons skilled in the art. Such different torque-measuring systems range from those that incorporate or use (a) mechanical dial type torque gages and torque sense-slip clutch mechanisms, as shown, for example, by U.S. Pat. Nos. 4,539,852 and 4,716,772, (b) strain gages as shown by U.S. Pat. Nos. 4,023,404 and 4,811,850, (c) torque sensors producing a digital electronic readout as shown by U.S. Pat. No. 4,794,801, and (d) pneumatic torque-sensing gages as disclosed by U.S. Pat. Nos. 3,866,463 and 4,696,144. See also U.S. Pat. No. 3,495,452, issued Feb. 17, 1970 to C. E. Johnson, Jr. et al for "Torque Meter".

OBJECTS AND SUMMARY OF THE INVENTION

The primary object of the present invention is to provide a new method and apparatus for accurately and rapidly measuring the torque required to rotate a given member relative to another member, with said new method and apparatus being characterized by simplicity and reliability.

Another object is to provide an accurate and reliable apparatus and method for non-destructively testing for a predetermined minimum release torque of screw-type caps on containers.

A further object of the invention is to provide an improved apparatus for testing for the torque required to cause relative rotation of two rotatably coupled members regardless of the direction of rotation Another more specific object is to provide an apparatus and method that is adapted to test various kinds of products for the torque required to cause relative rotation of two rotatably coupled components of said products, e.g., to test for the release torque of screw- or twist-type caps on containers, or to measure the minimum torque required to rotate a motor shaft or turn the inner and outer races of a bearing relative to one another.

A more specific object is to provide an improved torque tester that uses an optical encoder to generate an electrical signal representative of the magnitude of the applied torque.

These and other objects hereinafter described or rendered obvious are achieved by a device that comprises: (1) a pair of parallel flexible mechanical beams mounted in like cantilever fashion to a common support that is carried by a chassis; (2) a torque-transmitting shaft rotatably mounted to the chassis; (3) a force-transmitting arm having one end attached to the torque-transmitting shaft so as to rotate therewith, the other end of said arm extending between and adjacent to said beams; (4) an encoder having a rotatable input shaft; (5) means coupling said torque-transmitting shaft and said input shaft so that rotation of said torque-transmitting shaft will cause rotation of said input shaft; and (6) means on said torque-transmitting shaft for coupling said torque-transmitting shaft to one component of the article to be tested, e.g., the screw cap on a tube or bottle, whereby a torque applied to said one component is transmitted to the torque-transmitting shaft. When a torque is applied to one component of the test article, e.g. a screw cap on a container, the torque-transmitting shaft acts via the force-transmitting arm to bend one or the other of the two beams, according to the direction of rotation of said shaft. The encoder translates the rotation of the torque-transmitting shaft into an electrical output that varies as a function of the torque required to cause relative rotation of said one component. Additional means may be provided for producing an output signal that is indicative of the torque applied to said one component.

BRIEF DESCRIPTION OF THE DRAWINGS

For a fuller understanding of the nature and objects of the invention, reference should be had to the following detailed description taken in connection with the accompanying drawings wherein.

DETAILED DESCRIPTION OF THE INVENTION

Figure 1:
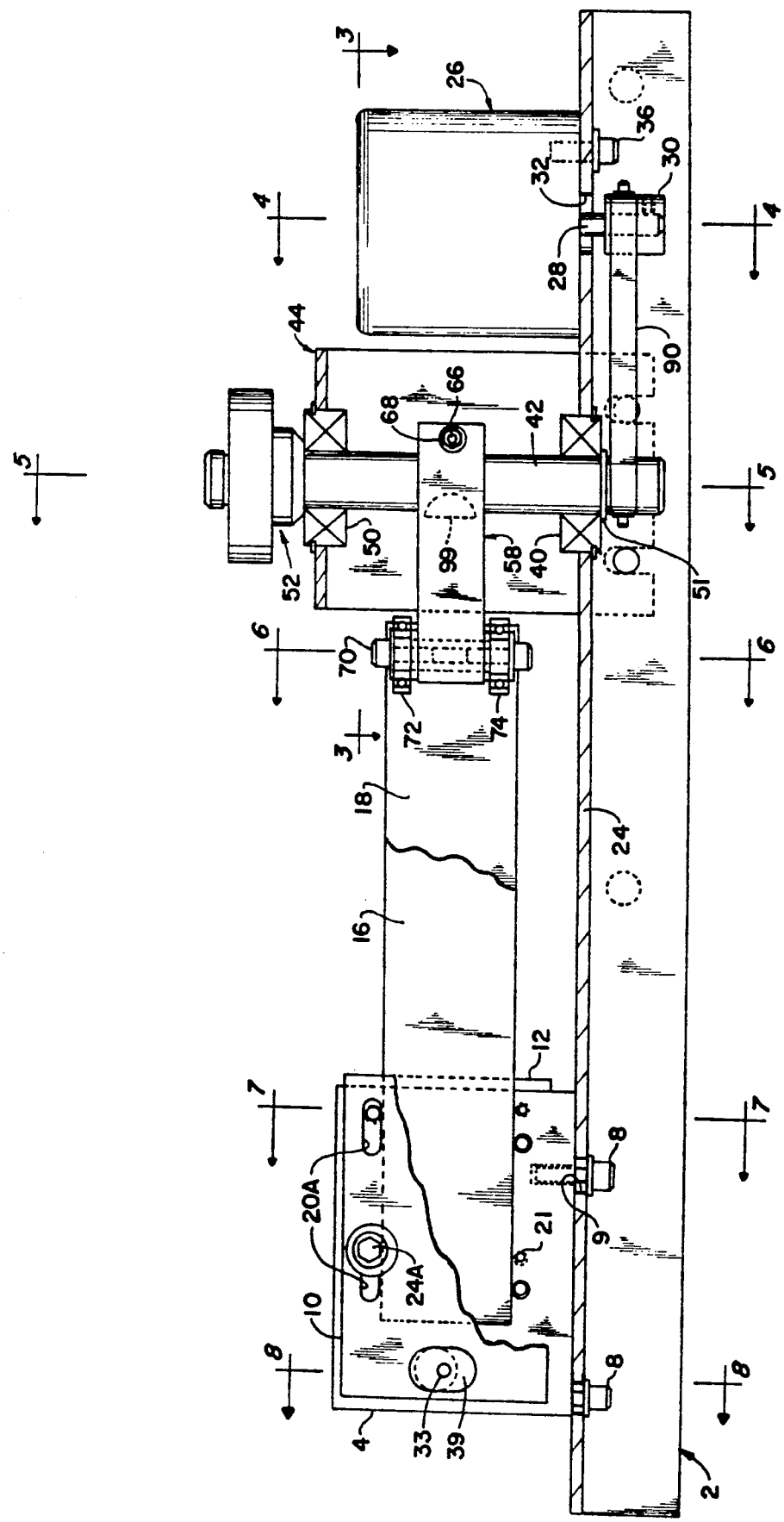
FIG. 1 is a sectional view in side elevation of apparatus constituting a preferred embodiment of the invention.
Figure 2:
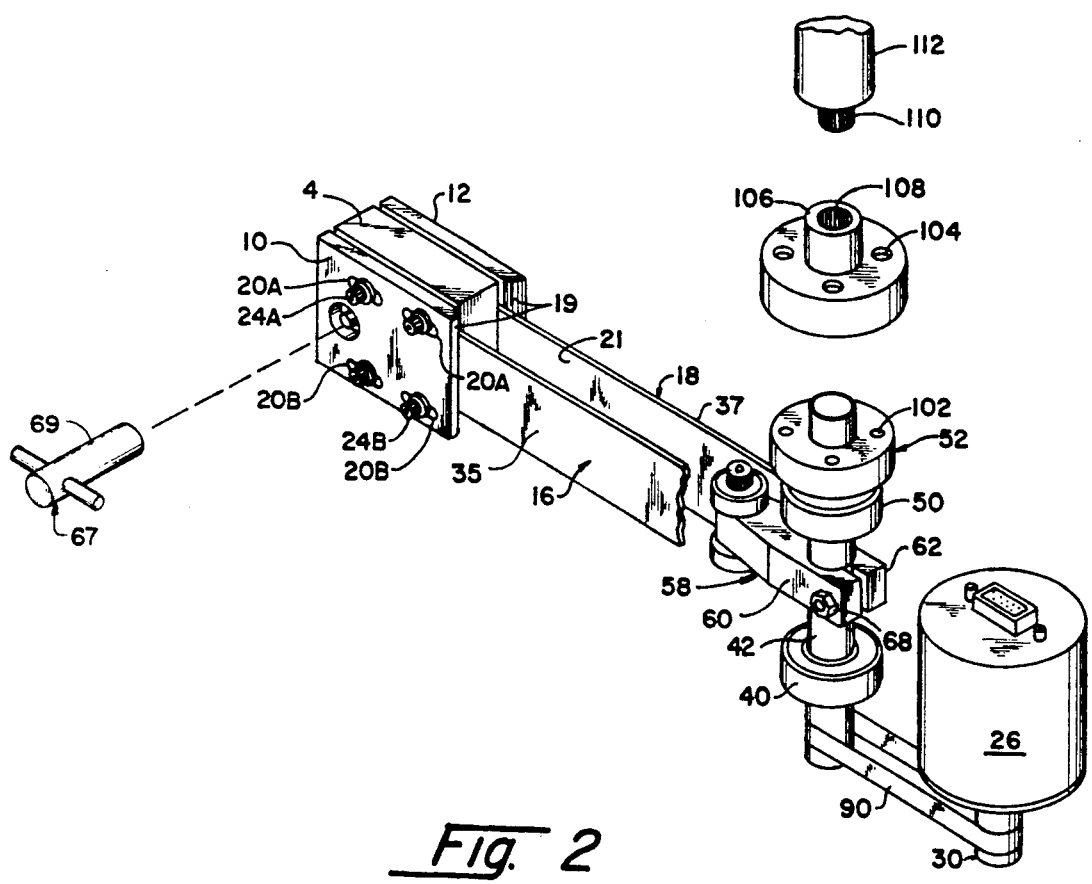
FIG. 2 is a fragmentary perspective view of a portion of the apparatus shown in FIG. 1.

Referring now to FIGS. 1 and 2, the preferred embodiment of the invention comprises a chassis 2 on which is mounted a mounting block 4 by means of threaded fasteners or screws 8. Screws 8 extend through elongated holes 9 in bridge section 24 of chassis 2. Holes 9 are elongated in the direction of the longitudinal axis of chassis 2, block 4 and the beams 16 and 18 hereinafter described, whereby to permit adjustment of block 4 on chassis 2 relative to the axis of rotation of the beam-deflecting arm 58 hereinafter described. Associated with mounting block 4 are two metal connector plates 10 and 12 and two identical flexible metal beams 16 and 18 respectively. Connector plates 10 and 12 have a plurality of horizontally elongated apertures 20A, 20B (FIG. 2) which are adapted to accommodate the shafts of a plurality of screw 24A, 24B that are screwed into tapped holes 21 in the fixed anchor block 4. The elongated apertures 20 allow lengthwise adjustment of plates 10 and 12 relative to block 4. The beams 16 and 18 extend between the upper and lower sets of screws 24A and 24B and are clamped between block 4 and plates 10 and 12 respectively. Preferably the front ends of plates 10 and 12 are bevelled as shown at 19 (FIG. 2).

The two beams 16 and 18 extend parallel to the bridge section 24 (FIGS. 1 and 4-8) of chassis 2. It is assumed, for the purposes of this description, that chassis 2 is oriented in a horizontal plane and bridge section 24 and beams 16 and 18 extend horizontally as shown in FIG. 1. Beams 16 and 18 are flat members, and they are oriented so that their major opposite surfaces extend vertically at a right angle to the plane of bridge section 24.

Also attached to the chassis is an incremental encoder 26 having an input shaft 28 to which is secured a pulley 30 (FIG. 1). Shaft 28 extends through an oversized hole 32 in bridge section 24. Encoder 26 is secured to the chassis by various means, e.g., by one or more screws 36. Encoder 26 may take various forms and may operate on an optical or magnetic basis. Preferably encoder 26 is a conventional incremental digital optical encoder that is adapted to emit or generate a series of electrical output pulses as its input shaft is rotated, with each pulse being representative of a predetermined angular increment of rotation. The encoder may but need not be of a kind that is adapted to indicate by its signal output the direction of rotation of its input shaft.

Figure 8:
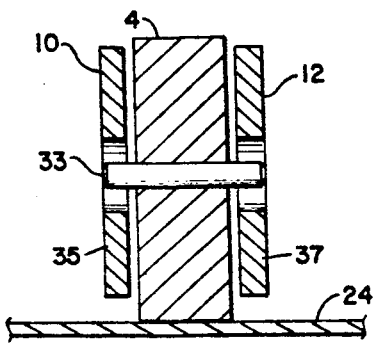

Disposed and fixed in a through hole in block 4 is a transversely extending shaft 33 (FIGS. 1 and 8). The opposite ends of shaft 33 protrude from the opposite sides of block 4 and terminate flush with or just short of the outer surfaces 35 and 37 of plates 10 and 12. As is evident from FIG. 1, shaft 33 is spaced from the rear ends of beams 16 and 18. Connector plates 10 and 12 have aligned vertically elongated holes 39 through which the ends of shaft 33 are exposed. The outer ends of shaft 33 have a circular cross-sectional configuration and have a diameter substantially smaller than the width of holes 39, i.e., the distance between the midpoints of the opposite vertically-elongated sides of holes 39. Shaft 33 and holes 39 are provided for the purpose of providing a precise way of changing the positions of connector plates 10 and 12 relative to beams 16 and 18 by small increments. In this connection, a socket-type tool 67 (FIG. 2) is provided having a shaft 69 with an eccentric socket hole (not shown) at its free end that is sized so that shaft 69 will make a close but rotatable fit on either end of shaft 33. The outer diameter of shaft 69 is only about 0.001 inch less than the width of holes 39, i.e., the distance between the midpoints of the opposite vertically-elongated sides of holes 39, as viewed in FIG. 1.

The foregoing construction permits adjustment of the effective length of each beam. Thus, for example, if it is desired to increase the effective length of beam 16, the user loosens the screws 24A, 24B that clamp connector plate 10 to beam 16 just enough to permit movement of that plate relative to block 4, inserts shaft 69 of tool 47 into hole 39 of connector plate 10, so that the socket hole (not shown) of shaft 69 is mated with shaft 33, and then rotates the tool counterclockwise (as seen in FIG. 1) through an angle sufficient to provide the required adjustment. Rotation of the tool 67 counterclockwise will cause its shaft 69 to provide a camming action on the edge surface of plate 10 that defines hole 39, causing connector plate 10 to move to the left as seen in FIG. 1, thereby increasing the effective length of beam 16. Once the desired adjustment has been made, screws 24A, 24B are re-tightened to cause plate 10 to again clamp beam 16 to support block 4, and the tool is removed. Obviously, if tool 67 is rotated clockwise, it will cause connector plate 10 to move to the right as seen in FIG. 1, thereby decreasing the effective length of beam 16. The effective length of beam 18 is modified in the same way, except that clockwise rotation of tool 67 is required to move plate 12 to the left as seen in FIGS. 1 and 2. The foregoing adjustment process may be used to adjust the effective length of either or both beams, as desired.

Mounted to the chassis in between mounting block 4 and encoder 26 are several components which are used to deflect the beams 16 and 18 and also operate the encoder 26 so as to cause the encoder to provide an output signal representative of the torque that is used to cause deflection of one or the other of beams 16 and 18.

Figure 5:
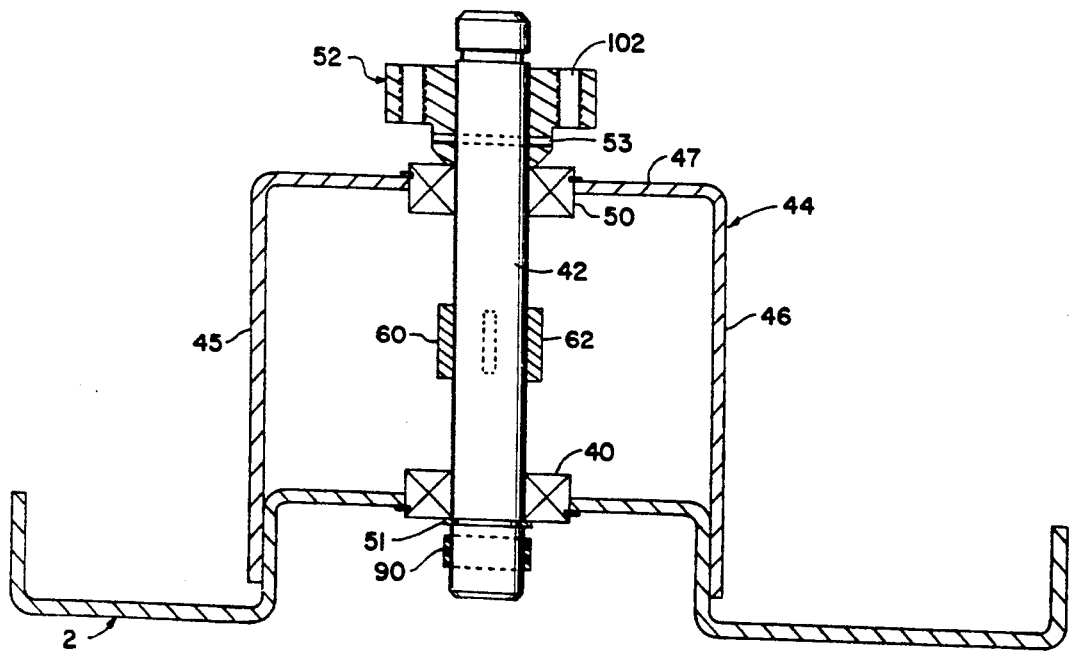
Figure 6:
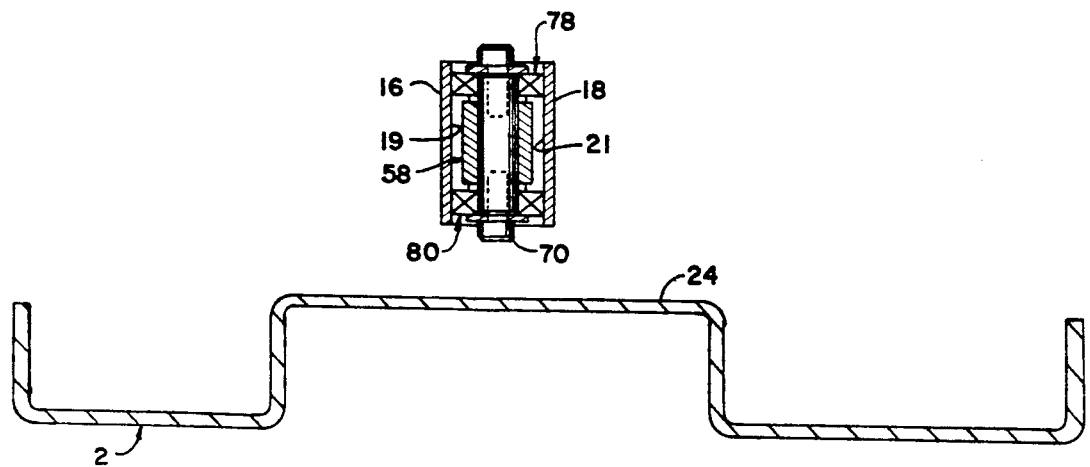
Figure 7:
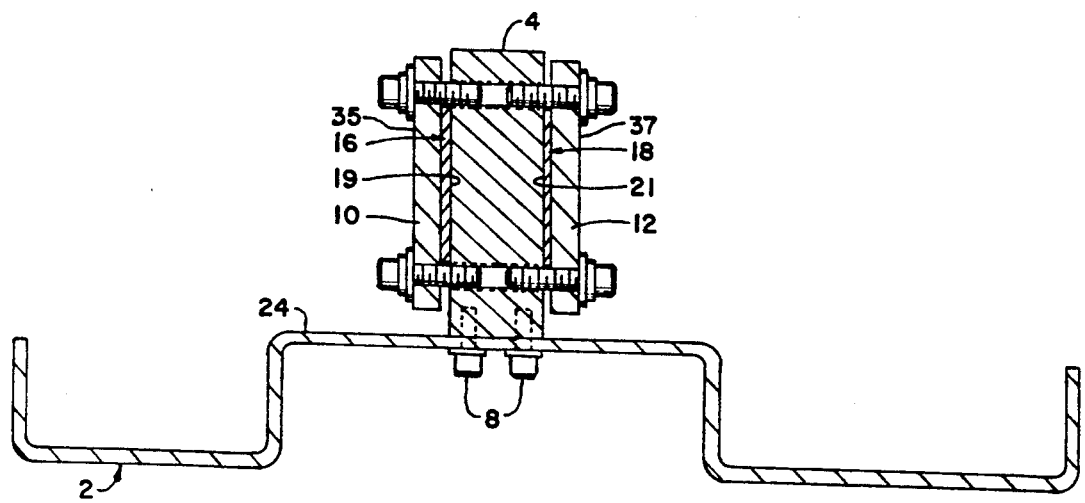

More particularly, with reference to FIG. 1, mounted in and secured to the horizontal bridge section 24 of the chassis is a bearing schematically represented at 40. Bearing 40 provides a support for a rotatable shaft 42. Also mounted to the chassis 2 is a U-shaped bracket member 44 (FIG. 5) having a pair of vertically-extending sections 45 and 46 that are attached to and support an upper horizontally-extending section 47. A second bearing 50 for shaft 42 is mounted in and secured to bracket section 47. Preferably but not necessarily, bearings 40 and 50 are roller or ball bearings. Shaft 42 is locked against axial movement relative to the bearings. This may be accomplished in various ways. Preferably, it is accomplished by (a) mounting a spring-type snap or split retaining ring 51 in a groove in shaft 42 so that the ring slidingly engages the inner race of bearing 40 and (b) mounting and securing a collar member 52 to the upper end of shaft 42 so that the collar rides on the inner race of bearing 50. Preferably collar member 52 is locked to shaft 42 by a roll pin 53 (FIG. 5). As an alternative measure, a second retaining ring may be mounted in a second groove in the upper end of the shaft, with the second groove located so that the second ring will ride on the inner race of bearing 50, in which event the collar member 52 may be mounted above the second retaining ring. Shaft 42 is rotatable on its axis relative to the chassis and the U-shaped member 44 by virtue of the bearings 40 and 50.

Attached to shaft 42 is a lever arm 58 that is bifurcated at one end so as to provide a pair of arms 60 and 62 that embrace shaft 42 and are forced into a tight, non-rotating relation with shaft 42 by means of a screw 66 that extends through aligned holes in arms 60 and 62 and is secured by a nut 68. Hence rotation of shaft 42 will cause lever arm 58 to swivel with it. In order to make certain that lever arm 58 will not rotate relative to shaft 42, it is preferred, but not essential, that a key 99 be placed in aligned grooves in arm 58 and shaft 42.

The free end of lever arm 58 extends between beams 16 and 18 and is provided with a hole in which is mounted a shaft 70. Affixed and rotatable relative to shaft 70 are two identical rollers 72 and 74 that engage the free ends of beams 16 and 18. Rollers 72 and 74 engage the beams as closely as possible to their free ends. Rollers 72 and 74 may take various forms. In the preferred embodiment of the invention, as shown in FIG. 1, rollers 72 and 74 are the outer races of bearings 78 and 80 (FIG. 6) which have their inner races affixed to shaft 70. Preferably, but not necessarily, shaft 70 is affixed to lever arm 58 so that it cannot rotate relative to that arm, and the bearings 78 and 80 permit their outer races 72 and 74 to rotate as they engage and deflect one or the other of the beams 16 and 18 according to the direction of rotation of arm 58.

The spacing between beams 16 and 18 in their undeflected state is set so that their inner surfaces 19 and 21 respectively (FIG. 6) are spaced from one another by a distance equal to the outer diameter of rollers 72 and 74, less about 0.0001 inch. As a result, when shaft 42 is at rest and no torque is being applied to shaft 42, the rollers 72 and 74 will be in engagement with beams 16 and 18, but that engagement will be such that the beams 16 and 18 are essentially in an undeflected state.

Figure 3:
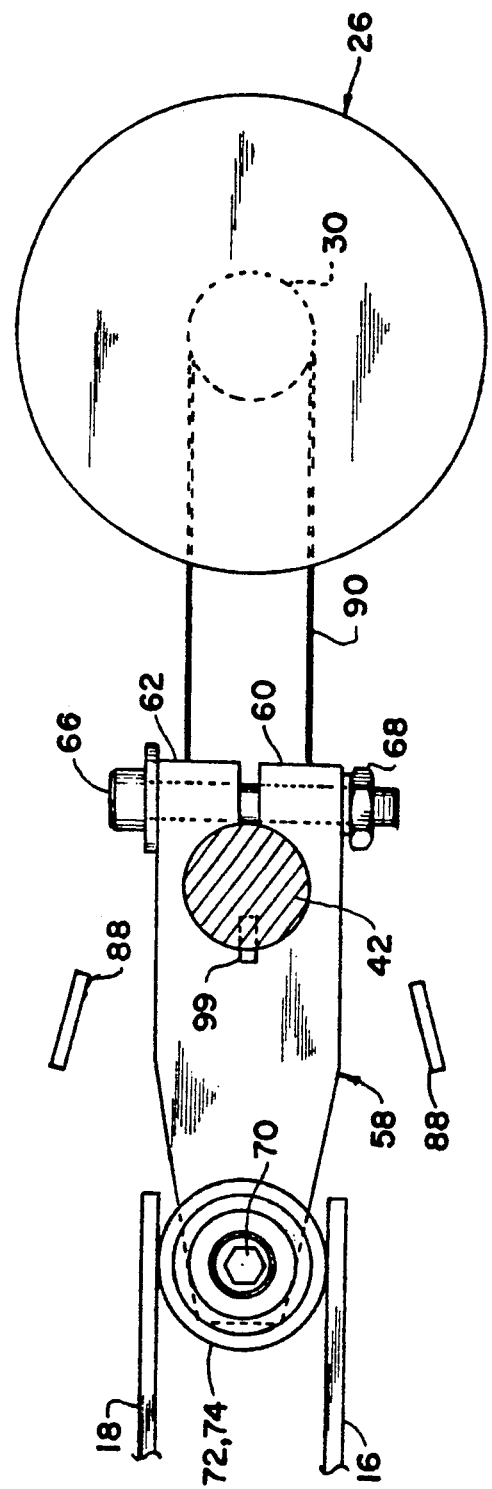
FIG. 3 is an enlarged fragmentary plan sectional view taken along line 3—3 of FIG. 1 showing a selected portion of the same apparatus.
Figure 4:
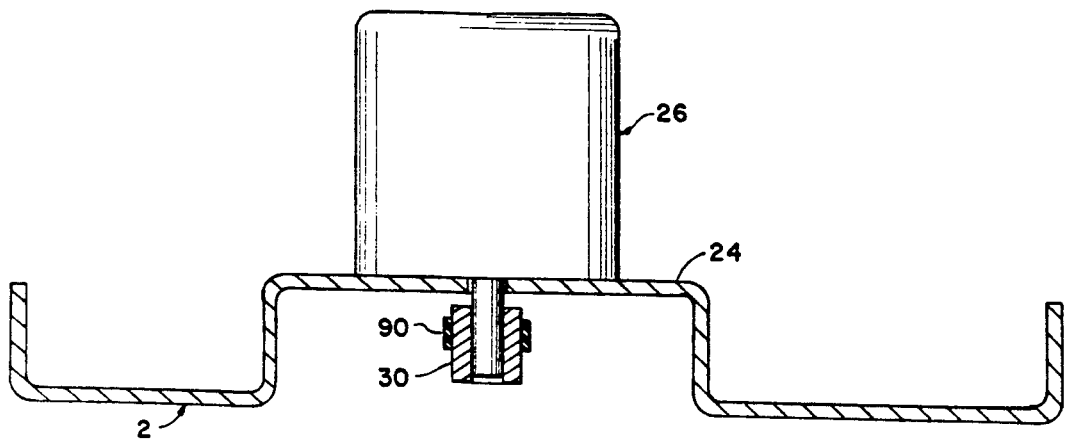
FIGS. 4-8 are sectional views in elevation taken along lines 4—4, 5—5, 6—6, 7—7 and 8—8 of FIG. 1.

A pair of mechanical stops 88 (FIG. 3) may be provided to intercept and limit rotation of arm 58 to a selected number of degrees in either direction, e.g., 10 degrees.

An endless belt 90 (FIGS. 1, 4, and 5) tightly embraces shaft 42 adjacent its lower end. Belt 90 may, but need not, reside in a groove in shaft 42; alternatively shaft 42 may have a pulley (not shown) attached thereto adjacent its bottom end for carrying belt 90. Belt 90 also tightly embraces the pulley 30 (FIG. 1) on the lower end of input shaft 28 of encoder 26. Accordingly, when shaft 42 is rotated, lever arm 58 will cause one or the other of the beams 16 and 18 to deflect, according to the direction of rotation of shaft 42. Simultaneously, the resulting movement of belt 90 will cause operation of the encoder 26, so that encoder input shaft 28 will rotate in one direction or the other according to the direction of rotation of shaft 42, whereby the encoder will provide an output (in the form of a stream of pulses) which indicate the direction and magnitude of the rotation of shaft 42 and 28.

Collar member 52 preferably is provided with a plurality of tapped holes 102 whereby it may be connected to a suitable adaptor member by means of screws (not shown) that pass through holes in the adaptor member and are screwed into holes 102. The adaptor member may take various forms, depending on the particular use for apparatus embodying the invention.

FIG. 2 illustrates one form of adaptor member 104. In this case the adaptor member is designed for testing the release torque value of caps on flexible container tubes of the type used to contain a commodity such as toothpaste, salve, cream, lotion, and the like. Adaptor 104 has a cylindrical extension 106 with a center bore 108 that is sized and grooved or splined as shown in FIG. 2 so as to receive and lock against rotation the knurled cap 110 of an empty plastic or metal flexible container tube 112, e.g., a tube for holding a commodity such as a toothpaste. For the purposes of using this invention, the tube 112 may be empty or filled with a commodity. In any event, the tube 112 has a threaded cylindrical extension onto which the knurled cap 110 is screwed. With cap 110 inserted in center bore 108 so that it is gripped by the adaptor member, rotation of tube 112 will result in a corresponding rotational movement of adaptor 104, collar 52, and shaft 42 until a torque level is reached that is sufficient to unlock cap 110 from tube 112.

Figure 9:
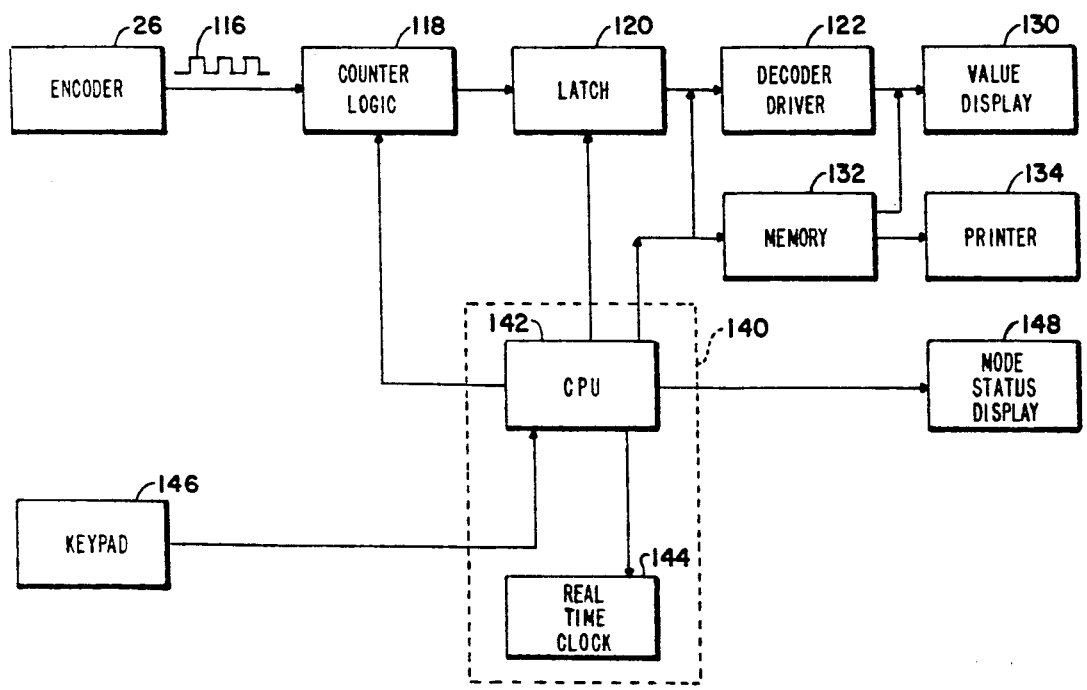
FIG. 9 is a schematic diagram illustrating the electronic system that constitutes part of the preferred embodiment of the invention.

FIG. 9 schematically illustrates one form of electronic circuit that may be coupled to encoder 26 so as to render the apparatus shown in the above-described figures operational from the standpoint of providing an output indication of the magnitude of the torque required to cause, for example, unscrewing of cap 110 from tube 112.

Turning now to FIG. 9, the electrical output of encoder 26 may consist of one or two like series of pulses, which may be rectangular pulses as shown at 116. Thus, encoder 26 may be of a type that provides two identical phase-displaced series of rectangular pulses, so that the counter logic can determine the direction of rotation of the encoder input shaft according to the phase relationship of the two series of pulses. In such event, the two series of rectangular pulses are fed to a counter logic circuit 118 which compares the two series of pulses to determine the direction of rotation of the encoder input shaft. The counter logic circuit produces a single train of output signal pulses representative of the direction and degree of rotation of the encoder shaft, and that train of output signal pulses is fed to a latch circuit 120 which comprises a conventional up-down latch-type digital counter. Latch circuit 120 counts the pulses from counter logic circuit 118 and stores the maximum count, which occurs when there is a sharp reduction in resistance to torque, e.g., as occurs, for example, when tube 112 (FIG. 1) is twisted with sufficient torque to cause it to rotate relative to cap 110 in the unscrewing mode. In other words, a certain amount of torque needs to be applied to initiate or commence unscrewing of the tube from the cap, and that torque is measured by determining the degree of rotation of the encoder input shaft as permitted by the bending resistance of beam 16 or 18 (depending on the direction of rotation) to the force applied thereto by lever arm 58. The latter arm will turn as torque is applied, until the torque is sufficient to unlock the tube from the cap, at which point the bending force applied by lever arm 58 to the beam 16 or 18 will decrease sharply, causing the cantilever beam 16 or 18, as the case may be, to resist further turning of arm 58 and shaft 42 in the same direction, and thereby preventing further rotation of the encoder input shaft in the same direction.

When the tube and cap shown in FIG. 2 are unlocked from one another, there is a consequent reduction in the torque applied to shaft 42. In the absence of any torque applied to shaft 42 via collar 52, the restoring force provided by the energy stored in the deflected elastic beam is sufficiently great to return lever arm 58 to its neutral position, whereupon the resulting reverse movement of shaft 42 will cause the encoder input shaft to rotate back to its original at-rest position. However, while the counter logic circuit will show a reduction in its count due to reverse movement of shaft 42, the latch circuit 120 will retain the maximum count received from counter logic circuit 118.

Latch circuit 120 retains the maximum count received from circuit 118 and is adapted to provide a digitally encoded output signal representing the maximum number of pulses in a positive or negative direction, i.e., counterclockwise or clockwise, produced by rotation of shaft 42. That output signal is fed to a decoder/driver circuit 122 which decodes it into a signal form suitable for driving a visual digital display unit 130. The latter comprises a plurality of alpha-numeric display devices adapted to provide an alpha-numeric indication of the measured torque value and the date (and optionally,, the time) of the test. The digitally encoded output from latch circuit 120 also is fed to an electronic memory unit 132 where it is stored temporarily. The memory unit 132 is coupled to a printer 134 which is adapted to be activated on a demand basis or according to a predetermined program, e.g., when a predetermined number of values have been stored in the memory unit. Memory unit 132 also is coupled to the input of display unit 130.

The system of FIG. 9 also includes a timing/control logic circuit 140 that may take various forms, but preferably comprises a digital computer represented as a CPU 142 and a real time clock 144. The CPU 142 has an input port connected to a keyboard 146. The input signal to the CPU from clock 144 provides the current date and time, and the CPU in turn is coupled to the counter logic circuit 118, latch circuit 120, decoder driver 122, display unit 130, memory unit 132 and printer 134.

Timing/control logic circuit 140 also is coupled to drive a Mode Status visual electronic display unit 148. Mode Status display unit 148 preferably comprises a plurality of display devices adapted to provide alpha-numeric indications of the status of the equipment with respect to various operational parameters. Preferably, but not necessarily, unit 148 comprises six display devices each adapted to selectively display on command one or more of the following visual messages: "Ready To Test", "Metric", "Fail", "Open", "Live", and "Close". Keypad 146 is used to select the desired Mode Status.

A display of the "Ready To Test" message means that the apparatus is operational, i.e., it is ready to test a specimen for torque value. It is preferred that the CPU be programmed so that normally all torque measurements are in English units. However, the CPU also is programmed so that, by supplying an appropriate command via keypad 142, it will cause the decoder/driver circuit 122 to convert the pulse count to a metric basis, whereupon the values displayed by display unit 130 and recorded in memory will be in metric units. The fact that measurements are being conducted on a metric basis is disclosed by having the Mode Status display unit display the message "Metric".

A display of the message "Fail" by the Mode Status display unit is an indication that the system is set to indicate when the torque resistance of a particular article or specimen under test does not meet specifications. In this connection, it is to be appreciated that the CPU can be programmed with upper and lower torque resistance limits and instructions to cause the display unit 130 to display a "Fail" message if the measured torque resistance is outside of those limits, i.e., too high or too low. The "Fail" mode Status is displayed by display unit 148 so long as the system is set in the "Fail" mode. The "Fail" message presented by display unit 130 is not displayed between measurements or when the measured torque resistance falls within the predetermined limits.

The CPU also is programmed so that, on command from the keypad, it will activate the Mode Status display unit 148 so as to selectively display one of the following messages: "Open", "Close", or "Live". The "Open" message means that the system is set so that the torque measurement involves application of torque in a counterclockwise direction, and the latch circuit 120 is operative to count and latch the output of the encoder. The "Close" message means that system is set so that the torque measurement involves application of torque in a clockwise direction, and the latch circuit is operative to count and latch. The "Live" message means that the system is set so that it will measure torque in a counterclockwise or direction, but the latch circuit will count but not latch, i.e., the count from counter logic circuit 118 is applied directly to decoder/driver circuit 122, so that the value presented by display unit 130 will increase or decrease according to the output of counter logic circuit 118.

The keypad also is used to transmit "Save", "Clear", and "Print" signals to the CPU. The "Save" signal instructs the CPU to command the memory to save the torque resistance values received from decoder/driver 122. The "Clear" signal instructs the CPU to clear the memory and also reset circuits 118, 120, 122, 130, 132 and 148, and also printer 134. The "Print" signal commands the memory to dump the information stored therein into the memory of the printer unit, and also commands the printer unit to produce a printed record of that information.

It is to be appreciated that the keypad 142 may be replaced by a plurality of manually operated switches, since the purpose of the keypad is simply to issue a select but limited number of commands to the CPU.

It is to be appreciated that the amount of deflection of the beam 16 or 18 by rotation of torque arm 58 is a function of the applied torque, the length of arm 58, the effective lengths of beam 16 (or 18) and arm 58, the beam dimensions, and the bending modulus of the beam. By moving the connector plates 10 and 12 axially relative to beams 16 and 18 so as to shorten the distance between those plates and shaft 42, the effective length of the beams is shortened and hence made stiffer. Hence the range of possible torque measurement can be varied by repositioning plates 10 and 12. That range can also be varied by replacing the beams with thicker or thinner beams.

In any event, the torque that causes deflection of beam 16 or 18 produces a force on that beam via lever arm 58 that varies as a cosine of the angle between arm 58 and the beam that is being deflected. Accordingly the CPU is programmed so as to cause the decoder/driver 122 to modify the pulse count from counter logic 118 so that (a) it reflects the fact that the force applied to the beam 16 or 18 by rotation of torque lever arm 58 varies as a function of the cosine of the angle between arm 58 and the beam being deflected by that arm, and (b) the values in torque units displayed by display unit 130 will vary uniformly as a function of the cosine of that angle. The CPU also is programmed to vary the input to decoder driver 122 so as to provide a suitable calibration correction as hereinafter described. Preferably the CPU is programmed to process the data stored in memory unit 132 so that selectively, on command from keyboard 146 or automatically, the memory will provide an output to display unit 130 or printer 134 that indicates one or more of the following: (a) the highest (and/or lowest) measured value within the predetermined limits, (b) the average of the measured values, (c) the standard deviation, (d) the total number of articles or specimens tested, and (e) the date (and optionally, the time) of the test. Additionally, if the specimens are identified by a lot or specimen number, that further identification may be inputted by the keyboard, and the CPU may be programmed so that the further identification inputted by the keypad will cause that information to be stored in memory unit 132 and/or included in a printout from printer 134.

The preferred mode of practicing the invention involves use of a bi-directional incremental optical encoder having an optical disk arranged so as to generate 36,000 bits (pulses or counts) per each full revolution of its input shaft. The apparatus is arranged so that the maximum beam deflection angle, i.e., the angle of deflection under full scale torque, is 10 degrees; this translates into 1000 encoder counts (bits) per each 10 degrees, or 100 counts per 1.0 degree. The plates 10 and 12 are set to provide for a beam deflection behavior such that 100% of torque (i.e., full scale torque) represents 1000 encoder pulses during static calibration. The calibration is accomplished preferably by coupling weights to shaft 42 in amounts selected so as to successively represent 25%, 50% and 75% of the full scale torque, and the resulting encoder counts are recorded and then adjusted by adding or subtracting counts as may be required to compensate for non-linearity. For example, if a 75% torque input caused a count of 748 instead of 750 to be displayed, 2 counts would be added to adjust the encoder output. Similarly compensation would be provided through the entire calibration procedure, i.e., for the 25% and 50% torque values.

The nature and bending modulus of elasticity of the beam material, the mechanical geometry of the beams, and the stress levels to which the beams are subjected are selected so as to optimize the long term performance and reliability of the apparatus. These considerations, coupled with the above-described calibration procedure, enable the practitioner of the invention to convert an expected non-linear beam deflection curve to a substantially linear beam deflection curve with an accuracy deviation of 0.2% or less, but in any event at least less than 0.5%.

The invention is susceptible of various additions and modifications that are obvious to persons skilled in the art. Beams 16 and 18 may be made of different metallic and non-metallic materials, although stainless steel is preferred. Also, it is to be appreciated that the invention may be used for many different applications. Consequently, for example, the adaptor member 104 may be replaced by other adaptors or tools designed to facilitate torque testing of different articles, e.g., roller or ball bearings, electric motor shafts, and other products. Use of a single resilient beam instead of two beams also is possible, although then torque may be measured only in one direction of rotation.

Of course, the control circuit shown in FIG. 9 may be varied according to preferences of circuit engineers as to how to best process the output of the digital encoder. Also, although no specific computer program is provided for the timing/control logic circuit 140 or the CPU 142, how to program a digital computer or CPU unit is well within the skill of the art, and, therefore, no further explanation, description or drawing is required to be submitted with respect to the aspect of the invention. Still other changes, modifications and additions are obvious to persons skilled in the art and are considered to be within the scope of this invention. Therefore, the scope of this invention is to be determined by the appended claims which are to be considered in the context of the spirit and letter of the foregoing description The following claims, the foregoing description, and the abstract are all to be considered as parts of the disclosure of the invention.

What is claimed is:

1. Apparatus for measuring torque comprising:
   a chassis;
   a support attached to said chassis;
   first and second parallel flexible beams mounted to said support in parallel relationship with one another in cantilever fashion;
   a torque-transmitting shaft rotatably mounted to said chassis;
   a force-transmitting arm having a first end affixed to said torque-transmitting shaft so as to rotate therewith and a second end extending between and adjacent to said beams so that rotation of said arm by said shaft will cause deflection of one or the other of said beams depending upon the direction of rotation of said arm, each of said beams having the capability when bent of applying a restoring force to said arm and shaft;
   an encoder having a rotatable input shaft;
   means coupling said torque-transmitting shaft and said encoder input shaft so that rotation of said torque-transmitting shaft will cause rotation of said encoder input shaft;
   coupling means mechanically connected to said torque-transmitting shaft for coupling the latter to an article to be subjected to torque measurement, said article having a first member mounted in rotatable relationship with a second member and adapted to be coupled to said coupling means, whereby when a torque is applied to one of said first and second members of said article by external means, the torque-transmitting shaft (1) acts via said force-transmitting arm to force one or the other of said beams to bend according to the direction of rotation, and (2) causes operation of the encoder so as to cause the encoder to produce an output signal that varies as a function of the degree of rotation of said shaft and the torque required to cause relative rotation of said first and second members; and
   electrical means coupled to said encoder for providing an output indication of the magnitude of the torque required to cause relative rotation of said first and second members.

2. Apparatus according to claim 1 wherein said second end of said torque-transmitting arm carries at least one roller for engaging said beams.

3. Apparatus according to claim 1 further including means for adjusting the effective length of at least one of said beams relative to said support.

4. Apparatus according to claim 1 wherein said support is a block fixed to said chassis, and further wherein said apparatus comprises first and second plates on opposite sides of said block, with said first and second beams extending between said block and said first and second plates respectively, screw means releasably securing said plates to said block, whereby tightening said screws causes said plates to clamp said beams to said block.

5. Apparatus according to claim 4 further including first means affixed to said block and second and third means on said plates for use in selectively adjusting the positions of said first and second plates relative to said block, whereby to selectively vary the effective length of said beams relative to said block.

6. Apparatus according to claim 4 having first and second adjusting means for selectively adjusting the positions of said first and second plates respectively relative to said block, whereby to vary the effective lengths of said beams.

7. Apparatus according to claim 3 further including cam means operatively associated with at least one of said first and second adjusting means so that rotation of said cam means will cause displacement of one of said plates relative to said support.

8. Apparatus according to claim 1 wherein said electronic means comprises means for determining and displaying the magnitude of the torque required to cause relative rotation of said first and second members of said article.

* * * * *